(12) United States Patent
Wright et al.

(10) Patent No.: US 8,563,898 B1
(45) Date of Patent: Oct. 22, 2013

(54) DETECTION AND REMOVAL OF SNOW AND ICE ON A LENS OF A LIGHT EMITTING DIODE LIGHTING FIXTURE

(75) Inventors: Timothy Glen Wright, Peachtree City, GA (US); Gerry Thornton, Sharpsburg, GA (US); Smita Anaokar, Smyrna, GA (US)

(73) Assignee: Cooper Technologies Company, Houston, TX (US)

( * ) Notice: Subject to any disclaimer, the term of this patent is extended or adjusted under 35 U.S.C. 154(b) by 141 days.

(21) Appl. No.: 13/205,025

(22) Filed: Aug. 8, 2011

Related U.S. Application Data

(60) Provisional application No. 61/372,519, filed on Aug. 11, 2010.

(51) Int. Cl.
  *B60L 1/02* (2006.01)
  *B60Q 1/14* (2006.01)
  *B60Q 1/00* (2006.01)
  *B60Q 1/26* (2006.01)

(52) U.S. Cl.
  USPC ............................. 219/202; 315/77; 362/487

(58) Field of Classification Search
  USPC .................................................. 200/202–203
  See application file for complete search history.

(56) References Cited

U.S. PATENT DOCUMENTS

| | | | | |
|---|---|---|---|---|
| 4,071,736 | A * | 1/1978 | Kamerling | 219/219 |
| 5,040,411 | A * | 8/1991 | Medzius | 73/73 |
| 5,763,858 | A | 6/1998 | Jones | |
| 5,990,628 | A * | 11/1999 | Birrell | 315/151 |
| 6,601,983 | B1 | 8/2003 | Runfola et al. | |
| 7,211,771 | B1 | 5/2007 | Smith et al. | |
| 2003/0150129 | A1* | 8/2003 | Kang et al. | 34/519 |
| 2006/0061466 | A1* | 3/2006 | Garcia Briz | 340/479 |
| 2007/0020465 | A1* | 1/2007 | Thiel et al. | 428/428 |
| 2007/0181565 | A1* | 8/2007 | Murahashi et al. | 219/629 |
| 2012/0019151 | A1* | 1/2012 | Lum | 315/158 |

* cited by examiner

*Primary Examiner* — Douglas W Owens
*Assistant Examiner* — Dedei K Hammond
(74) *Attorney, Agent, or Firm* — King & Spalding LLP

(57) ABSTRACT

A light emitting diode (LED) lighting fixture has monitoring and control circuits that sense when a freezing condition is present that could result in ice and/or snow accumulation on a lens of the LED lighting fixture, thereby reducing the light output therefrom. Heat may be supplied to the lens from a transparent resistive coating thereon, an internal space heater and/or increased power dissipate from the LEDs.

21 Claims, 7 Drawing Sheets

DETECTION AND REMOVAL OF SNOW AND ICE ON A LENS OF A LIGHT EMITTING DIODE LIGHTING FIXTURE

RELATED PATENT APPLICATION

This application claims priority to commonly owned U.S. Provisional Patent Application Ser. No. 61/372,519; filed Aug. 11, 2010; titled "Systems, Methods and Devices for the Detection and Removal of Snow and Ice on a Lens of an LED Light Fixture," and is hereby incorporated by reference herein for all purposes.

TECHNICAL FIELD

The present disclosure relates generally to lighting fixtures having light emitting diode ("LED") light sources, and more particularly to removal and/or prevention of accumulation of snow and ice on a lens of the LED lighting fixture.

BACKGROUND

The use of LEDs in place of conventional incandescent, fluorescent, and neon light sources has a number of advantages. LEDs tend to be less expensive and longer lasting than conventional incandescent, fluorescent, and neon light sources. In addition, LEDs generally can output more light per watt of electricity than incandescent, fluorescent, and neon light sources. Further, LEDs typically generate less heat during operation than conventional incandescent, fluorescent, and compact fluorescent light sources.

While the minimization of heat generation with LEDs is beneficial for interior fixtures (because air conditioners do not have to also overcome the heat being generated by the LED fixtures in addition to ambient temperatures and other electrical devices), it can actually cause some problems for exterior fixtures. For example, during the winter, in certain locations, snow and ice (also known as frozen precipitation) builds up on lighting fixtures, including street lights and traffic signal lights. Those street lights and traffic signal lights using conventional incandescent or fluorescent fixtures generate enough heat to prevent snow and ice from building up on the lens of the fixture. However, since LED-based fixtures don't generate as much heat, there is a tendency for them to allow for more ice and snow build-up on the lens area of the fixture. This build-up reduces the amount of light being output by the fixture, thereby reducing its effectiveness. In the case of traffic signal lights, the build-up can be such that motorists are unable to determine what the signal is and thereby creates an unsafe situation.

SUMMARY

Therefore, what is needed are systems, methods, and devices for preventing and/or detecting the build-up of snow or ice on a LED fixture lens and means for reducing or eliminating that build-up.

According to a specific example embodiment of this disclosure, a light emitting diode (LED) lighting fixture having frozen precipitation removal capabilities comprises: a housing comprising an interior and a light-emitting window; at least one LED disposed within the housing and positioned to emit light through the light-emitting window; a light transmissive lens disposed over the light-emitting window, the lens having an exterior surface and an interior surface; at least one environmental sensor; a frozen precipitation removal apparatus; and a monitoring and control circuit for receiving environmental values from the at least one environmental sensor and for controlling the frozen precipitation removal apparatus, wherein when a frozen precipitation condition is determined by the monitoring and control circuit the snow and/or ice prevention/removal apparatus is activated.

According to another specific example embodiment of this disclosure, a method for removing frozen precipitation from a light emitting diode (LED) lighting fixture comprises the steps of: providing a housing comprising an interior and a light-emitting window; positioning at least one LED within the housing, wherein light is emitted from the at least one LED through the light-emitting window; disposing a light transmissive lens over the light-emitting window, the lens having an exterior surface and an interior surface; providing at least one environmental sensor; providing a frozen precipitation removal apparatus; monitoring at least one environmental value from the at least one environmental sensor; determining whether a frozen precipitation condition exists; and activating the frozen precipitation removal apparatus when the frozen precipitation condition exists.

According to yet another specific example embodiment of this disclosure, a method for removing frozen precipitation from an exterior of a lens of a light emitting diode (LED) lighting fixture comprises the steps of: receiving ambient light at a photo control relay; determining if an amount of the ambient light received at the photo control relay is less than a preset level; and increasing current being supplied to at least one LED when the amount of ambient light is less than the preset level.

According to still another specific example embodiment of this disclosure, a method for removing frozen precipitation from an exterior of a lens of a light emitting diode (LED) lighting fixture comprise the steps of: providing a light emitting diode (LED) lighting fixture with a lens, wherein the lens comprises an electrically resistive coating thereon; receiving ambient light through the lens with a photo control relay; determining if an amount of the ambient light received at the photo control relay is less than a first preset level; and transmitting a current through the electrically resistive coating when the amount of ambient light is less than the first preset level.

BRIEF DESCRIPTION OF THE DRAWINGS

For a more complete understanding of the present invention and the advantages thereof, reference is now made to the following description, in conjunction with the accompanying figures briefly described as follows.

Figure 1:
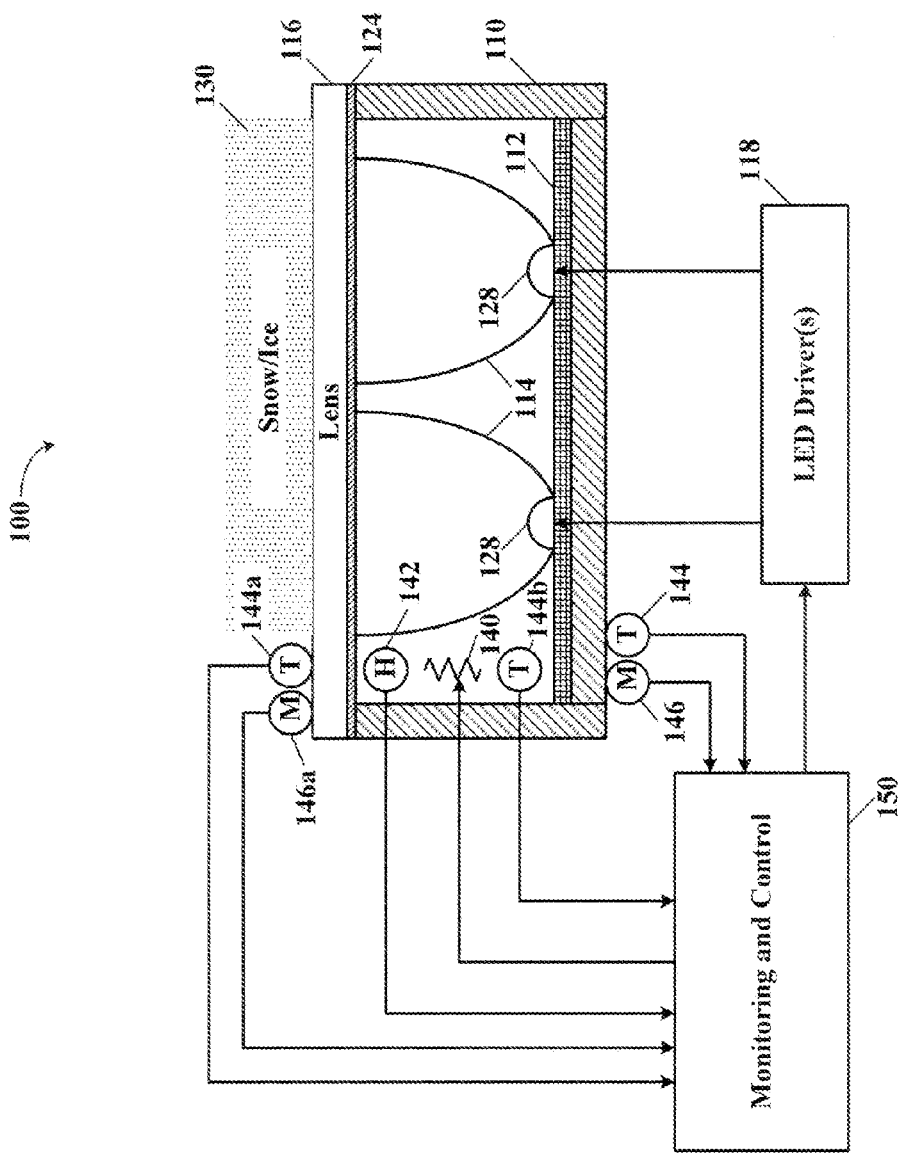
FIG. 1 is a general schematic diagram of a LED lighting fixture, according to a specific example embodiment of the present invention.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION OF THE EXEMPLARY EMBODIMENTS

Embodiments of the present invention are directed to systems, methods, and devices for detecting and removing snow and ice from a lens of a LED lighting fixture. In certain example embodiments, the LED lighting fixture is a traffic light. Alternatively, the LED lighting fixture can be any one that is configured for outdoor use including, but not limited to LED roadway and road sign lighting fixtures, LED post-top lighting fixtures, LED step light and building facade lighting fixtures, and LED pathway lighting fixtures.

Referring to FIG. 1, depicted is a general schematic diagram of a LED lighting fixture, according to a specific example embodiment of the present invention. A LED lighting fixture 100, generally represented by the numeral 100, includes a housing 110. In certain example embodiments, the housing 110 includes a back wall, multiple side walls and a light-emitting window or opening through which light is emitted. The housing can include a heat sink (not shown) or alternatively the housing 110 can act as a heat sink.

The housing 110 includes a LED circuit board 112 disposed therein. In certain example embodiments the circuit board 112 is coupled to the housing 110 using known attachment methods and is in thermal communication with the housing 110. The circuit board 112 may include one or more sheets of ceramic, metal, laminate, circuit board, Mylar, or other material. One or more LEDs 128 are disposed on and/or electrically coupled to the circuit board 112 and are configured to emit light. Each LED 128 includes a chip of semiconductive material that is treated to create a positive-negative ("p-n") junction. When the LED package 128 is electrically coupled to a power source, such as a LED driver 118, current flows from the positive side to the negative side of each junction, causing charge carriers to release energy in the form of incoherent light.

The wavelength or color of the emitted light depends on the materials used to make the LED package 128. For example, a blue or ultraviolet LED can include gallium nitride ("GaN") or indium gallium nitride ("InGaN"), a red LED can include aluminum gallium arsenide ("AlGaAs"), and a green LED can include aluminum gallium phosphide ("AlGaP"). Each of the LEDs in the LED package 128 can produce the same or a distinct color of light. For example, the LED package 128 can include one or more white LED's and one or more non-white LEDs, such as red, yellow, amber, or blue LEDs, for adjusting the color temperature output of the light emitted from the fixture 100. A yellow or multi-chromatic phosphor may coat or otherwise be used in a blue or ultraviolet LED to create blue and red-shifted light that essentially matches blackbody radiation. The emitted light approximates or emulates "white," incandescent light to a human observer. In certain example embodiments, the emitted light includes substantially white light that seems slightly blue, green, red, yellow, orange, or some other color or tint. In certain example embodiments, the light emitted from the LEDs in the LED package 128 has a color temperature between 2500 and 5000 degrees Kelvin.

In certain specific example embodiments, an optically transmissive or clear material (not shown) encapsulates at least a portion of each LED 128. This encapsulating material provides environmental protection while transmitting light from the LEDs 128. For example, the encapsulating material can include a conformal coating, a silicone gel, a cured/curable polymer, an adhesive, or some other material known to a person of ordinary skill in the art having the benefit of the present disclosure. In certain specific example embodiments, phosphors are coated onto or dispersed in the encapsulating material for creating white light. In certain example embodiments, the white light has a color temperature between 2500 and 5000 degrees Kelvin. In one example embodiment, each of the LEDs 128 of FIG. 1 emits white or substantially white light. While the specific example embodiment of FIG. 1 represents the LEDs 128 as two singular, discrete LEDs, the LEDs 128 can be an array of LEDs more that 2 LEDs or multiple LEDs disposed on one or more die packages or chip-on-board (COB) packages.

Disposed about each LED is a reflector 114. In certain embodiments, the reflector 114 has a frusto-conical or parabolic shape, however, other geometric and non-geometric shapes are also available depending on the desired light output from the particular fixture 100. The reflector 114 is made of metallic, semi-metallic or plastic materials and has an inner surface capable of reflecting light emitting by one or more LEDs 128. While the specific example embodiment of FIG. 1 shows a reflector around each LED 128, in alternative embodiments, the reflector can be disposed around multiple LEDs. In addition, while not shown, each LED 128 or group of LEDs 128 can include an over-optic (not shown) to direct the light emitted by the LED 128 in a desired direction.

A lens 116 is disposed over the light-emitting window or opening of the housing 110. The lens 116 is typically transparent and can be removably coupled to the housing 110 using known attachment methods to allow access to the interior of the housing 110. In certain specific example embodiments, the lens 116 includes a resistive coating 124 in thermal communication with the lens 116. This resistive coating 124 can be disposed and adhered to the bottom side of the lens 116 (as shown in FIG. 1), the top side of the lens 116, or between one or more lens 116 layers (not shown). In certain specific example embodiments, the resistive coating 124 is indium tin oxide (ITO), however, other resistive coatings known to those of ordinary skill in the art can be used in the alternative. The resistive coating 124 is electrically coupled to the monitoring and control circuit 150. When a current is sent to the resistive coating 124 from the monitoring and control circuit 150, the resistive coating 124 generates heat. The heat is transferred to the lens 116 through thermal conduction and also heats up the interior of the housing through thermal convection. In one specific example embodiment, the resistive coating 124 has a resistance of about 12 ohms/sq and a thickness of less than 4 millimeters. In one specific example embodiment, the resistive coating 124 imparts between 10-30 watts into the lens 116 and interior of the housing 110.

The circuit board 112 is electrically coupled to one or more LED driver(s) 118. The LED driver(s) 118 may be located at the lighting fixture 100 or remote from the lighting fixture 100. A resistance space heater 140 may be located within the housing 110 and used to heat the lens 116 and the interior of the housing 110 through thermal convection. Heat from the space heater 140 will melt and prevent ice and snow from forming on the face of the lens 116. The space heater 140 may also reduce fogging of the lens inside of the housing 110 by preventing water vapor caused by a high humidity condition inside of the housing 110 from condensing onto an inner surface of the lens 116. A humidity sensor 142 may be located within the housing 110 for detecting high humidity conditions therein. A temperature sensor(s) 144 may be located on an outer surface of the housing 110, and/or proximate to an outside face of the lens 116. A moisture sensor 146 may be located on an outer surface of the housing 110, and/or proximate to an outside face of the lens 116.

A monitoring and control circuit 150 may be used for processing temperature, moisture and/or humidity information from the sensors 144, 146 and/or 142, respectively, and to control power to the space heater 140, the resistive coating 124 and/or increase current to the LEDs 128 when a moisture condensation, or snow and/or ice accumulation condition is indicated. For example, a temperature sensor 144 may be used to sense when an outside temperature is approaching freezing so that one or more of the heat sources (e.g., space heater 140, the resistive coating 124 and/or increase of LED current) will maintain the outside surface of the lens 116 above freezing and thereby prevent ice and/or snow accumulation thereon. In addition, moisture condensation on the outside and/or inside surface(s) of the lens 116 will be prevented. The temperature sensor 144 and monitoring and control circuit 150 may be as simple as a thermal switch having a set point of, for example but not limited to, 38 degrees Fahrenheit+/−5 degrees Fahrenheit that turns on and off the heat source(s) as required depending upon the temperature outside of the housing 110. The monitoring and control circuit 150 may also be an "intelligent controller" e.g., a microcontroller and the like. A temperature sensor 144b and relative humidity sensor may be used in determining whether a dew point is near and the space heater 140 should be activated to prevent fogging and/or frost on an interior surface of the lens 116.

Figure 1A:
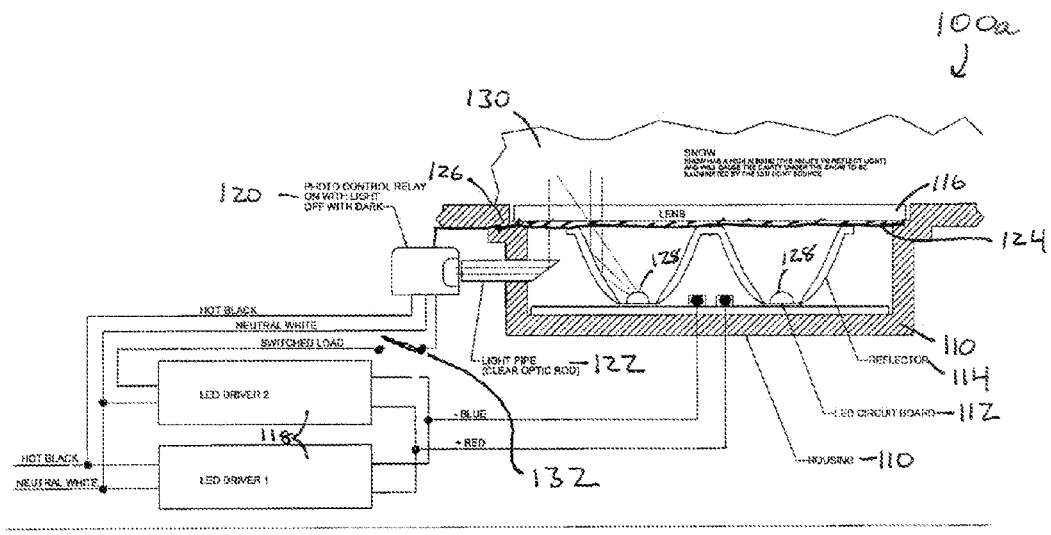
FIG. 1A is a general schematic diagram of a LED lighting fixture, according to another specific example embodiment of the present invention.
Figure 2:
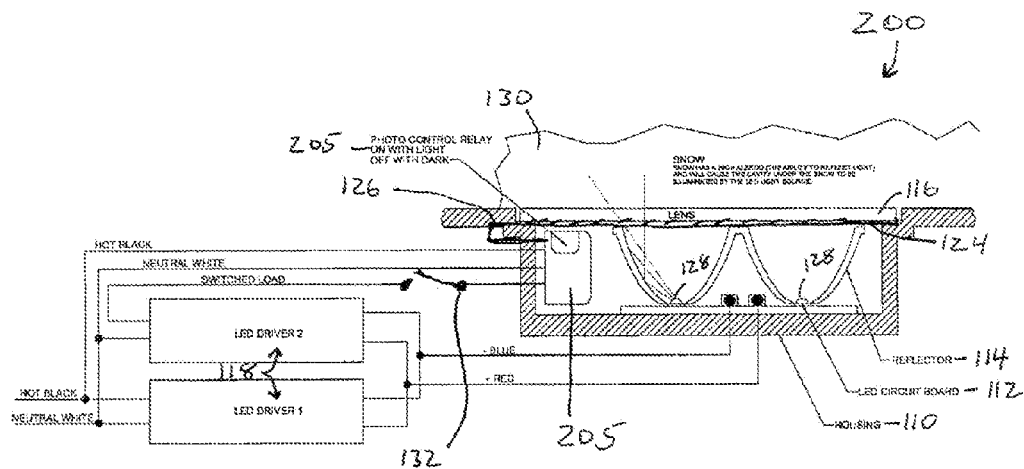
FIG. 2 is a general schematic diagram of a LED lighting fixture, according to yet another specific example embodiment of the present invention.

Referring to FIG. 1A, depicted is a general schematic diagram of a LED lighting fixture, according to another specific example embodiment of the present invention. In addition to or replacement of some or all of the features shown in FIG. 1, the lighting fixture 100a may also include a photo control relay 120. Examples of the photo (light) control relay 120 may include a photo (light) sensor, photo (light) switch. The photo control relay 120 may be electrically coupled to one or more of LED driver(s) 118. The photo control relay 120 may be positioned outside of the housing 110, as shown in FIG. 1A, or inside of the housing 110, as shown in FIG. 2. When the photo control relay 120 is positioned outside of the housing 110, one or more light pipes 122 may extend from the photo control relay 120 into the interior of the housing 110 through an aperture in the housing 110 and provide a light passageway therebetween. In certain specific example embodiments, the light pipes 122 are made of clear plastic rods or rod sections. In the manner shown in FIG. 1A, the photo control relay 120 can monitor the amount of ambient light being received into the interior of the housing 110 while being positioned outside of the housing 110.

Referring to FIG. 2, depicted is a general schematic diagram of a LED lighting fixture, according to yet another specific example embodiment of the present invention. Alternatively the photo control relay 120 can be positioned within the interior of the housing 110. In this specific example embodiment, light pipes are not necessary but can be used if desired. In both of the example embodiments shown in FIGS. 1A and 2, the photo control relay 120 senses and evaluates the amount of light being received into the housing 110 from the outside environment through the lens 116. When snow 130 or ice builds up on the exterior of the lens 116, the amount of light being received through the lens 116 and at the photo control relay 120 is diminished. When the light being received at the photo control relay 120 is diminished a predetermined amount or reaches a predetermined level, such as may represent a portion, a substantial portion, or all of the exterior surface of the lens 116 being covered in snow 130 or ice, an electrical current can be sent from the photo control relay 120 to the lead 126. Alternatively, the photo control relay 120 can send a signal to the monitoring and control circuit 150 (FIG. 1) which can then activate one or more of the heat sources. When power is applied to the resistive coating 124, the lens 116 will heat up to a temperature above freezing, thereby causing the snow 130 or ice to melt. In addition, the heat from the resistive coating 124 will also warm the interior of the housing 110 to prevent moisture condensation, e.g., fogging of the lens 116.

In an alternative method for removing snow and ice, when the light being received at the photo control relay 120 is diminished a predetermined amount, the amount of current being sent to the LEDs 128 can be increased from an optimum level or desired operating level to something above that. By increasing the amount of current to the LEDs 128, the amount of heat generated by the LEDs 128 is increased. This increases the amount of heat in the interior of the housing 110, which heats up the lens 116 directly along the light-emitting window and indirectly through the body of the housing 110 where the lens 116 is removably coupled thereto. For example, if the LEDs are currently receiving 600 mA and the relay 120 determines that snow 130 is covering the lens 116, then the amount of current to the LEDs 128 is increased to, for example, a level between from about 700 mA to about one (1) ampere of current. The amount of increase can be in incremental steps, can be a fixed amount above the current level, or can be determined by the maximum safe level of current that can safely be applied to the LEDs 128 being used in the fixture 100. When the photo control relay 120 begins sensing a sufficient level of ambient light and/or the temperature is at or above a present limit, the current level being sent from the LED driver 118 to the LEDs 128 can return back to the optimum operational level or can slowly be reduced in stages back to its previously lower level over time. While the aforementioned embodiments have been described in the alternative, they can be combined to further increase the amount of heat being provided to the lens 116.

In the specific example embodiments shown in FIGS. 1A and 2, the fixture 100 may optionally include a thermal switch 132 and/or a moisture switch positioned in series with and disposed electrically between one of the LED drivers 118 and the photo control relay 120. In this alternative specific example embodiment, the thermal switch 132 closes only when the temperature drops to or below a certain temperature, such as 0 degrees Celsius. Alternatively, the temperature setting can be anywhere between −20-+5 degrees Celsius and its Fahrenheit equivalents. In this alternative specific example embodiment, current can coupled to the resistive coating 124 for generating heat at the lens 116 and/or the amount of current to the LEDs 128 can be increased when the thermal switch 132 closes and the amount of ambient light being received by the relay 120 has reduced to the preset level representing a partial or total blockage of the lens 116. For the optional specific example embodiment that includes the moisture sensor 146a (FIG. 1), e.g., a moisture switch, the moisture switch closes only when a certain level of moisture is detected on the lens 116. Alternatively, a combination of moisture level and amount of time that moisture is sensed on the lens 116 can be used to close the switch. Thereafter, once the moisture switch is closed the operation is substantially the same as that for the thermal switch 132. In certain example embodiments, systems can return back to normal once the moisture is no longer sensed and the moisture switch reopens.

Referring to FIGS. 3-6, depicted are flow diagrams of methods for detecting and removing snow and ice from a lens of a LED lighting fixture, according to specific example embodiments of the present invention. These specific example methods are used to facilitate detection and removal of snow and/or ice from the lens of a LED fixture 100. The specific example methods are not limited to the steps presented or the order in which they are presented. FIGS. 3-6 are instead only being provided as specific examples of one of many ways that a person of ordinary skill in the art and having the benefit of this disclosure could use the specific example embodiments of FIGS. 1, 1A and 2 to detect and remove snow and ice from the lens 116 of a LED lighting fixture 100.

Figure 3:
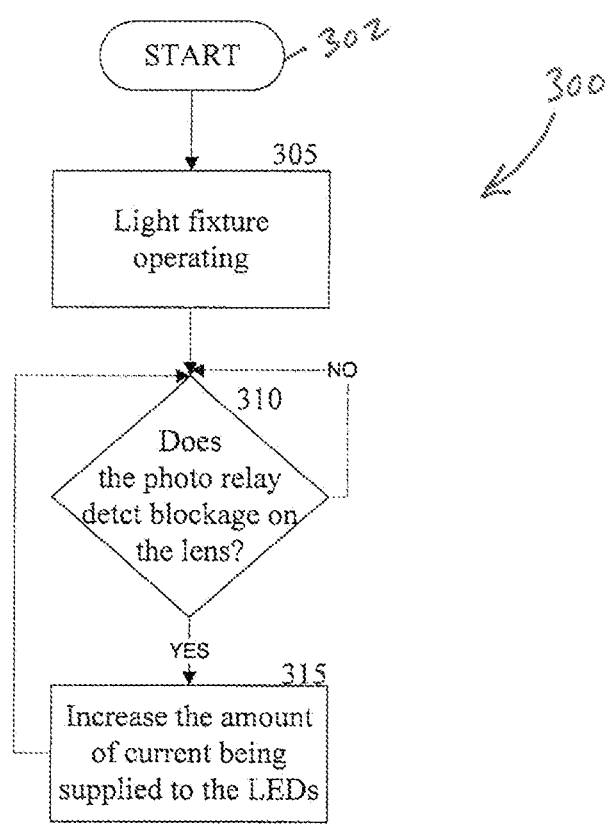
FIG. 3 is a flow diagram of a method for detecting and removing snow and ice from a lens of a LED lighting fixture, according to a specific example embodiment of the present invention.

The specific example method 300 shown in FIG. 3 begins at START step 302 and proceeds to step 305, where the fixture 100 is in operation and the LED's 128 are operating. In step 310, an inquiry is conducted to determine if the photo control relay 120 has determined that a sufficient amount of ambient light is not being received. If not, then the "NO" branch is followed to step 310. Otherwise, the "YES" branch is followed to step 315, where the amount of current being sent by the driver 118 to the LEDs 128 is increased. The process then returns back to step 310.

Figure 4:
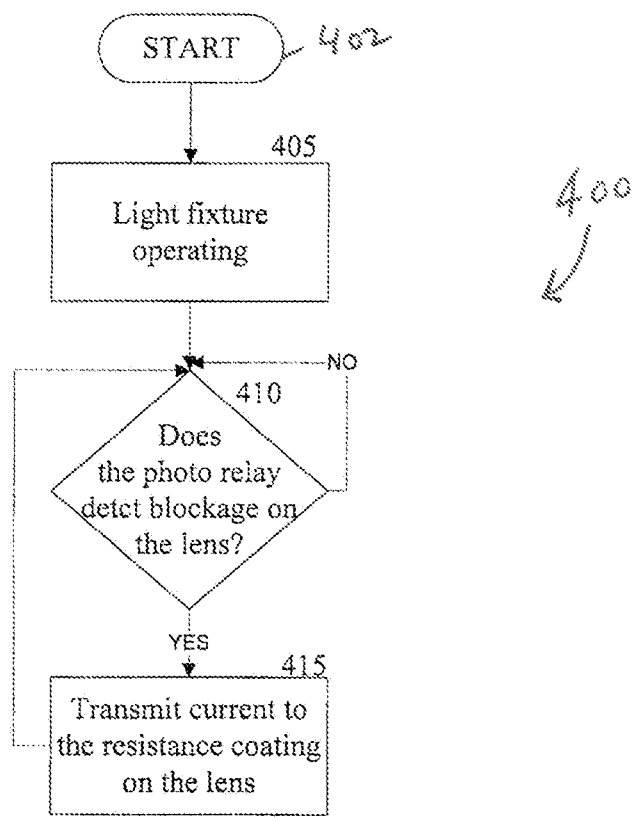
FIG. 4 is a flow diagram of a method for detecting and removing snow and ice from a lens of a LED lighting fixture, according to another specific example embodiment of the present invention.

FIG. 4 is another specific example method for detecting and removing snow and ice 130 from the surface of the lens 116. Referring now to FIGS. 1A, 2, and 4, the specific example method 400 begins at START step 402 and proceeds to step 405, where the fixture 100 is in operation and the LED's 128 are operating. An inquiry is conducted to determine if the photo control relay 120 has determined that a sufficient amount of ambient light is not being received in step 410. If sufficient light is still being received by the relay 120, the "NO" branch is followed to step 410. Otherwise, the "YES" branch is followed to step 415 where a current is transmitted to the lead 126 for the resistive coating 124. In one example embodiment, the current is transmitted through the relay 120. Alternatively, the relay 120 sends a signal to the monitoring and control circuit 150, e.g., a microprocessor, to send the current from the driver 118 to the lead 126. The process then returns back to step 410.

Figure 5:
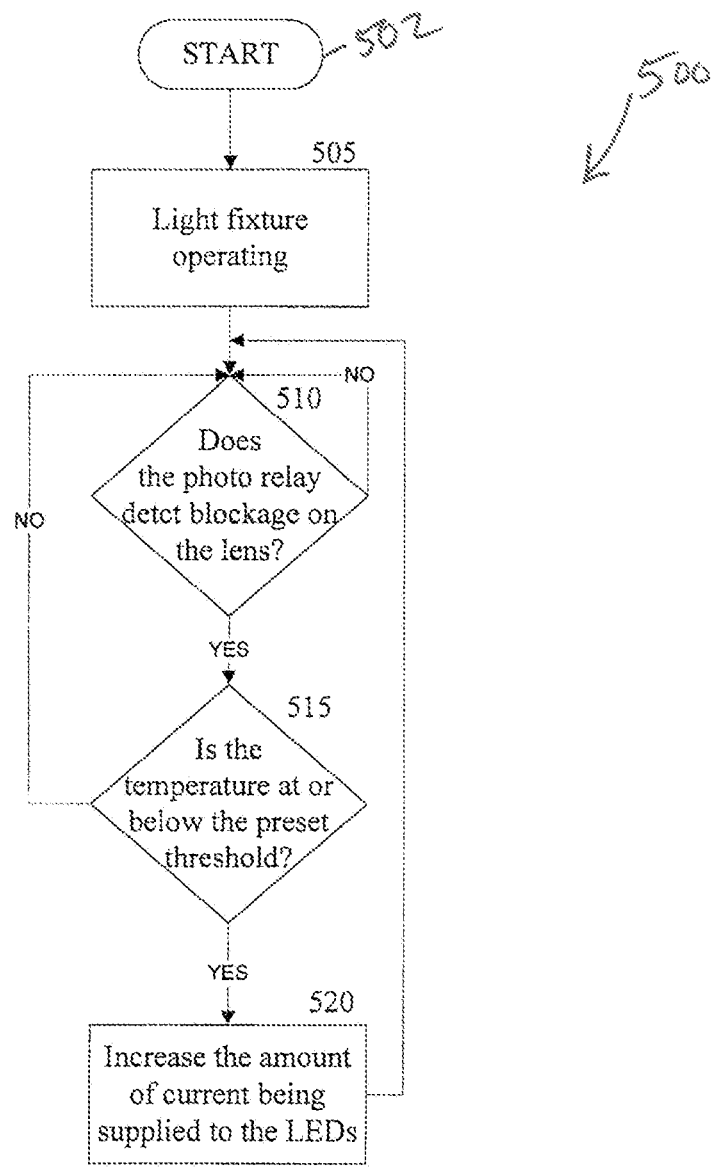
FIG. 5 is a flow diagram of a method for detecting and removing snow and ice from a lens of a LED lighting fixture, according to yet another specific example embodiment of the present invention.

FIG. 5 is another specific example method for detecting and removing snow and ice 130 from the surface of the lens 116. Referring now to FIGS. 1A, 2, and 5, the specific example method 500 begins at START step 502 and proceeds to step 505, where the fixture 100 is in operation and the LED's 128 are operating. In step 510, an inquiry is conducted to determine if the photo control relay 120 has determined that a sufficient amount of ambient light is not being received. If sufficient light is still being received by the relay 120, the "NO" branch is followed to step 510. Otherwise, the "YES" branch is followed to step 515. In step 515, an inquiry is conducted to determine if the ambient temperature is at or below a preset threshold. This determination is typically made by the thermal switch 132. As discussed above, the preset temperature can be anywhere between −20-+5 degrees Celsius and is capable of being adjusted as desired for the particular environment that the fixture is located. If the ambient temperature is not at or below the preset threshold, the "NO" branch is followed back to step 510. Otherwise, the "YES" branch is followed to step 520, where the amount of current being sent by the driver 118 to the LEDs 128 is increased. The process then returns back to step 510.

Figure 6:
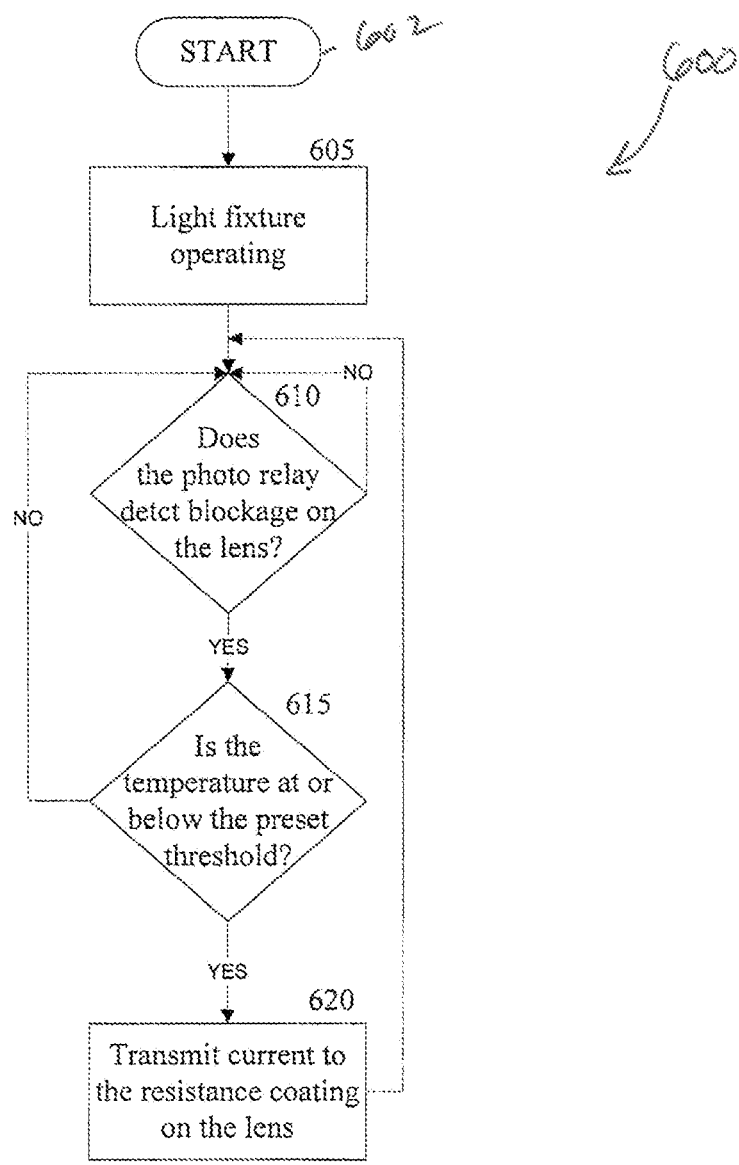
FIG. 6 is a flow diagram of a method for detecting and removing snow and ice from a lens of a LED lighting fixture, according to still another specific example embodiment of the present invention.

FIG. 6 is another specific example method for detecting and removing snow and ice 130 from the surface of the lens 116. Referring now to FIGS. 1A, 2, and 6, the specific example method 600 begins at the START step and proceeds to step 605 where the fixture 100 is in operation and the LED's 128 are operating. In step 610, an inquiry is conducted to determine if the photo control relay 120 has determined that a sufficient amount of ambient light is not being received. If sufficient light is still being received by the relay 120, the "NO" branch is followed to step 610. Otherwise, the "YES" branch is followed to step 615. In step 615, an inquiry is conducted to determine if the ambient temperature is at or below a preset threshold. As discussed above, the preset temperature can be anywhere between −20-+5 degrees Celsius and is capable of being adjusted as desired for the particular environment that the fixture is located. This determination is typically made by the thermal switch 132. If the ambient temperature is not at or below the preset threshold, the "NO" branch is followed back to step 610. Otherwise, the "YES" branch is followed to step 620, where a current is transmitted to the lead 126 for the resistive coating 124. In one example embodiment, the current is transmitted through the relay 120. Alternatively, the relay 120 sends a signal to a microprocessor to send the current from the driver 118 to the lead 126. The process then returns back to step 610.

Although specific example embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the example embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

We claim:

1. A light emitting diode (LED) lighting fixture comprising:
    a housing comprising an interior and a light-emitting window;
    at least one LED disposed within the housing and positioned to emit light through the light-emitting window;
    at least one LED driver configured to provide power to the at least one LED;
    a light transmissive lens disposed over the light-emitting window, the lens having an exterior surface and an interior surface;
    at least one temperature sensor;
    a frozen precipitation removal apparatus comprising an electrically resistive coating disposed over the interior surface of the lens, wherein the electrically resistive coating is light transmissive; and
    a monitoring and control circuit for receiving environmental values from the at least one temperature sensor and for controlling the frozen precipitation removal apparatus, wherein, when a frozen precipitation condition is determined by the monitoring and control circuit, the frozen precipitation removal apparatus is activated, wherein the frozen precipitation removal apparatus further comprises an LED driver circuit, wherein the LED driver circuit is coupled to and is controlled by the monitoring and control circuit such that the LED driver circuit supplies more current to the at least one LED when there is the frozen precipitation condition.

2. The LED lighting fixture according to claim 1, wherein the electrically resistive coating is electrically coupled to a power source by the monitoring and control circuit when there is the frozen precipitation condition.

3. The LED lighting fixture according to claim 2, wherein the electrically resistive coating disposed over the interior surface of the lens is activated when approach of a dew point is determined by the monitoring and control circuit based upon environmental information from relative humidity and temperature sensors within the housing.

4. The LED lighting fixture according to claim 1, wherein the LED driver circuit supplies more current to the at least one LED when approach of a dew point is determined by the monitoring and control circuit based upon environmental information from relative humidity and temperature sensors within the housing.

5. The LED lighting fixture according to claim 1, wherein the frozen precipitation condition is when a temperature of the exterior surface of the lens is near a freezing temperature for water.

6. The LED lighting fixture according to claim 1, further comprising a moisture sensor.

7. The LED lighting fixture according to claim 1, wherein the frozen precipitation condition is when a temperature of an exterior of the housing is near a freezing temperature for water.

8. The LED lighting fixture according to claim 1, wherein the at least one LED comprises an array of LEDs.

9. A method for removing frozen precipitation from an exterior of a lens of a light emitting diode (LED) lighting fixture, comprising the steps of:
supplying a first amount of current from one or more LED drivers to at least one LED of the LED lighting fixture;
receiving ambient light at a photo control relay;
determining if an amount of the ambient light received at the photo control relay is less than a preset level; and
increasing the current being supplied to the at least one LED of the LED lighting fixture to a second amount of the current when the amount of ambient light is less than the preset level, wherein the second amount of the current results in the at least one LED heating up an interior of a housing of the LED lighting fixture, wherein heating up the interior of the housing heats up the lens directly, wherein heating up the interior of the housing heats up the lens indirectly through a structure of the housing, and wherein a temperature of the lens increases to above freezing temperature in response to being heated.

10. The method according to claim 9, further comprising the step of decreasing the current being supplied to at least one LED of the LED lighting fixture to the first amount of the current when the amount of ambient light returns to at least the present level.

11. The method according to claim 9, wherein the second amount of the current is supplied to the at least one LED of the LED light fixture by the one or more LED drivers.

12. A method for removing frozen precipitation from an exterior of a lens of a light emitting diode (LED) lighting fixture, comprising the steps of:
providing a light emitting diode (LED) lighting fixture with a lens, wherein the lens comprises an electrically resistive coating thereon, wherein the electrically resistive coating allows light to pass therethrough;
receiving ambient light through the lens with a photo control relay;
determining if an amount of the ambient light received at the photo control relay is less than a first preset level;
transmitting a current through the electrically resistive coating when the amount of ambient light is less than the first preset level;
determining if a temperature is below a second preset level; and
increasing heat generated and transferred to the lens by increasing an amount of current being supplied to at least one LED when the amount of ambient light is less than the first preset level and the temperature is less than the second preset level.

13. A method for removing frozen precipitation from a lighting fixture, the method comprising the steps of:
providing a housing comprising an interior and a light-emitting window;
positioning at least one light emitting diode (LED) within the housing;
disposing a light transmissive lens over the light-emitting window, the lens having an exterior surface and an interior surface;
providing at least one temperature sensor;
coupling an LED driver between a power source and the at least one LED;
providing power to the at least one LED;
monitoring temperature with the temperature sensor to detect a freezing temperature condition near the light transmissive lens; and
increasing the amount of power provided from the LED driver to the at least one LED when the temperature falls below a predetermined level, wherein increasing the amount of power results in heat from the at least one LED heating up the interior of the housing, wherein heating up the interior of the housing heats up the lens directly, wherein heating up the interior of the housing heats up the lens indirectly through a structure of the housing, and wherein a temperature of the lens increases to above freezing temperature in response to being heated.

14. The method according to claim 13, further comprising the step of decreasing the amount of power being supplied to at least one LED when the temperature returns to the predetermined level.

15. The method according to claim 13, wherein the at least one LED comprises an array of LEDs.

16. A light emitting diode (LED) lighting fixture comprising:
a housing comprising an interior and a light-emitting window;
at least one LED disposed within the housing and positioned to emit light through the light-emitting window;
at least one LED driver configured to provide power to the at least one LED;
a light transmissive lens disposed over the light-emitting window, the lens having an exterior surface and an interior surface;
at least one temperature sensor;
a frozen precipitation removal apparatus comprising an electrically resistive coating disposed over the interior surface of the lens, wherein the electrically resistive coating is light transmissive; and
a monitoring and control circuit for receiving environmental values from the at least one temperature sensor and for controlling the frozen precipitation removal apparatus, wherein when a frozen precipitation condition is determined by the monitoring and control circuit the frozen precipitation removal apparatus is activated, wherein the frozen precipitation removal apparatus further comprises a resistive space heater within the interior of the housing, and wherein the resistive space heater is electrically coupled to a power source by the monitoring and control circuit when there is the frozen precipitation condition.

17. The LED lighting fixture according to claim 16, wherein the resistive space heater is activated when approach of a dew point is determined by the monitoring and control circuit based upon environmental information from relative humidity and temperature sensors within the housing.

18. A light emitting diode (LED) lighting fixture comprising:
- a housing comprising an interior and a light-emitting window;
- at least one LED disposed within the housing and positioned to emit light through the light-emitting window;
- at least one LED driver configured to provide power to the at least one LED;
- a light transmissive lens disposed over the light-emitting window, the lens having an exterior surface and an interior surface;
- at least one temperature sensor;
- a frozen precipitation removal apparatus comprising an electrically resistive coating disposed over the interior surface of the lens, wherein the electrically resistive coating is light transmissive; and
- a monitoring and control circuit for receiving environmental values from the at least one temperature sensor and for controlling the frozen precipitation removal apparatus, wherein when a frozen precipitation condition is determined by the monitoring and control circuit the frozen precipitation removal apparatus is activated, wherein the monitoring and control circuit comprises:
- a photo control relay electrically coupled to a LED driver circuit; and
- a thermal switch electrically coupled to the LED driver circuit and the photo control relay.

19. The LED lighting fixture according to claim 18, further comprising at least one light pipe, each light pipe having a proximate end and a distal end, wherein the proximate end is optically coupled to the photo control relay and the distal end is positioned within the interior of the housing and configured to receive ambient external light through the lens.

20. A light emitting diode (LED) lighting fixture comprising:
- a housing comprising an interior and a light-emitting window;
- at least one light emitting diode (LED) positioned within the housing;
- a light transmissive lens disposed over the light-emitting window, the light transmissive lens having an exterior surface and an interior surface;
- at least one temperature sensor; and
- an LED driver that is coupled between a power source and the at least one LED, wherein the LED driver is configured to provide power to the at least one LED, and wherein the temperature sensor is configured to monitor temperature to detect a freezing temperature condition near the light transmissive lens, and wherein the LED driver is configured to increase the amount of power the LED driver provides to the at least one LED when the temperature falls below a predetermined level, wherein increasing the amount of power results in heat from the at least one LED heating up the interior of the housing, wherein heating up the interior of the housing heats up the lens directly, wherein heating up the interior of the housing heats up the lens indirectly through a structure of the housing, and wherein a temperature of the lens increases to above freezing temperature in response to being heated.

21. The LED lighting fixture according to claim 20, further comprising a humidity sensor.

* * * * *